(No Model.)
J. M. HURLEY & J. R. WESTING.
CULTIVATOR.
No. 467,415. Patented Jan. 19, 1892.
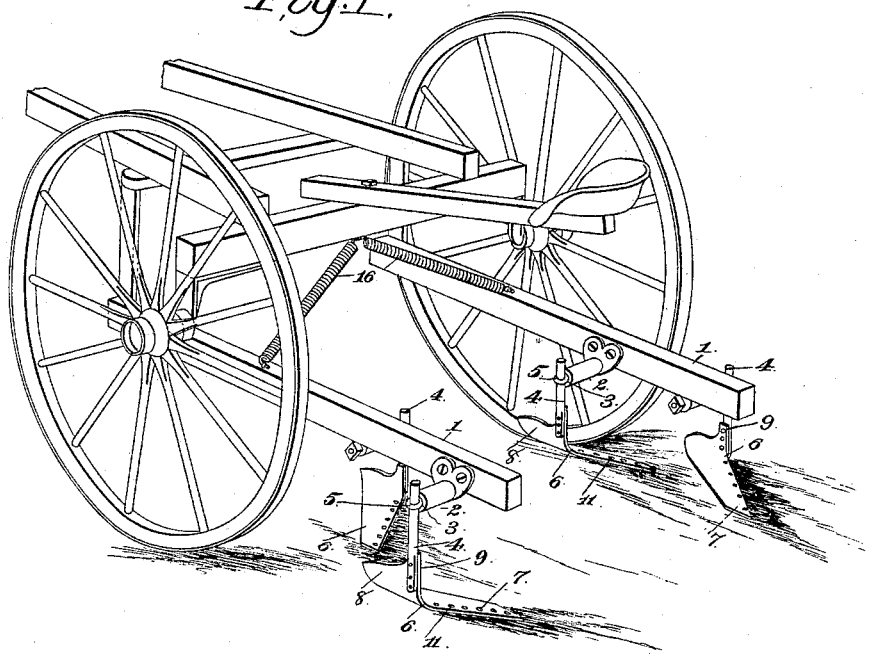
Witnesses
M. Fowler
Inventors
John M. Hurley and
John R. Westing
By their Attorneys,
C. A. Snow & Co.

UNITED STATES PATENT OFFICE.

JOHN M. HURLEY AND JOHN R. WESTING, OF LANCASTER, WISCONSIN.

CULTIVATOR.

SPECIFICATION forming part of Letters Patent No. 467,415, dated January 19, 1892.

Application filed September 2, 1891. Serial No. 404,546. (No model.)

*To all whom it may concern:*

Be it known that we, JOHN M. HURLEY and JOHN R. WESTING, citizens of the United States, residing at Lancaster, in the county of Grant and State of Wisconsin, have invented a new and useful Cultivator, of which the following is a specification.

Our invention relates to cultivators; and it has for its object to provide a cultivator of the class which is designed to cultivate when the ground is too hard for an ordinary springtooth or shovel cultivator, and to provide a cultivator which, while leaving the ground smooth after passing thereover, will not destroy the roots of the corn or other field or garden produce, and a cultivator which, if desired, can cultivate to a depth of about six inches below the surface and at the same time will cut all the weeds and other foreign growth, thus leaving the field clean and smooth and being so constructed as to be operated with less draft than in ordinary cultivators; and with these and other objects in view the invention consists of a double cultivator provided with opposite and reversely-arranged shares constructed and secured to the cultivator in the novel manner hereinafter more fully described, illustrated in the accompanying drawings, and specifically pointed out in the appended claims.

In the accompanying drawings, Figure 1 is a perspective view of a cultivator constructed in accordance with our invention. Figs. 2 and 3 are details, respectively, of our improved share provided with the hiller and prongs attachment.

Referring to the accompanying drawings, 1 1 represent the main central beams of the cultivator, which may be constructed of suitable material and in any suitable manner for the purposes for which the same is adapted. Suitably connected with the main beams are the right-angularly-disposed standard-slip castings 2, which are arranged on opposite sides of the main beam and at suitable distances from each other in order that the attachments secured to one standard-slip casting may not interfere with those secured to the other. Each of said castings extending from the main beam 1 is provided with the perforations 3, which are designed to secure the vertical standards 4, which are secured thereto at the distance required or desired from the main beam by means of the clamping or eye bolt 5, by means of which a ready adjustment of the standards may be obtained, and held in any position to the beams that may be desired. To the lower ends of each standard are secured the sweeps 6. The said sweeps are provided with a horizontal tapered portion 7, which is designed to be normally in an almost horizontal plane and travel over the ground in such position, and the enlarged end 8 of said sweep is turned up at almost a right angle to the body of the blade and thus forms a shield or end guard, which permits the same to travel nearer the corn or other produce that is being cultivated. The said sweeps or blades are further provided with an upwardly-extending tongue 9, projecting beyond the shield or guard 8 and having the perforations 10, by means of which by suitable bolts or rivets the said sweeps or blades are secured to the vertical standards, which are adjustably attached to the supplemental standard-casting. The front cutting-edges of the sweeps extend rearwardly at an angle from the standards to which the same are attached, the tapered ends thereof extending inwardly toward the central beam, and by such a location or placing of the sweeps those secured to the opposite casting extend in a reverse direction to that secured upon the opposite beam, and thus the tapered end of one blade lies directly behind and in the path of the tapered end of the preceding blade or sweep to more fully utilize the space which the cultivator takes up and to provide a greater cultivating area.

The sweeps or blades 6 are further provided along the rear edges thereof with a series of perforations 11, by means of which may be attached either hillers 12 or breaking and spreading prongs 13, which latter are better adapted for use with the sweep on account of the nature of the work accomplished. The hillers 12 are detachably connected with the sweeps by means of the bolts 14 and are provided with the spirally-turned ends 15, which take the broken earth, weeds, and briers and turn the same over into hills behind the path of the cultivator, when used both sweeps of course being provided with the same hillers, but arranged in a reverse direction. The said prongs 13 are also detachably connected with the sweeps by means of the bolts 14 and project in a straight line from the rear edge of the same, and thus provide means whereby the turned ground is broken up and thus leaving the weeds scattered and more exposed.

Secured to the front end of each of the main beams 1 of the cultivator is the coiled draft-springs 16, the other end of which is to be attached to the axle-tongue or other parts of the cultivator, as may be desired, the purpose of which springs is to draw the beam to the center of the cultivator and hold it in position whether used on level ground or in side-hill work, so that the sweeps will always be kept in position and operativeness as desired by the operator.

The construction and operation of our improved cultivator are now thought to be apparent without further description. It may also be noted at this point that by attaching, preferably, the subsoiler, for which we have made an application of about an even date with the present application, between the beams to the center of the cultivator and between the sweeps, the earth may be quite easily loosened up preparatory to cropping.

Having thus described our invention, what we claim, and desire to secure by Letters Patent, is—

1. In a cultivator, the combination, with the main central beams, of the vertically-adjustable oppositely-disposed standard and of the reversely and oppositely arranged horizontal sweeps having inwardly-tapered ends and secured to said opposite standards and projecting rearwardly and inwardly at an angle toward the beam and having the inner tapered ends lying directly in the path of travel of the tapered end of the sweep immediately in front, substantially as set forth.

2. In a cultivator, the combination, with the main central beams, of the vertical standards adjustably connected with said beams and of the sweeps having horizontal tapered portions projecting rearwardly and inwardly at an angle toward each main central beam and lying in the path of travel of the tapered portion of the sweep directly in front and having an enlarged upturned edge forming a shield or guard terminating in an upwardly-projecting tongue adapted to be rigidly connected to said vertical standards, substantially as set forth.

3. In a cultivator, the combination, with the beams and standards, of the sweeps secured to said standards and provided with a flat tapering horizontal portion and an enlarged upturned edge forming a shield or guard, substantially as set forth.

4. In a cultivator, the combination, with the main central parallel beam, of the flat horizontal sweeps adjustably connected with said beam and having horizontal tapered portions lying in the path of travel of each other and enlarged upturned edges forming shields or guards, and hilling and spreading devices detachably secured to the rear edge of the flat horizontal portions of said sweeps and projecting rearwardly therefrom in the same plane therewith, substantially as set forth.

In testimony that we claim the foregoing as our own we have hereto affixed our signatures in the presence of two witnesses.

JOHN M. HURLEY.
JOHN R. WESTING.

Witnesses:
GEO. CLEMENTSON,
DAVID SCHREINER.